Sept. 10, 1957 F. H. RAYMOND ET AL 2,805,823
IMPROVEMENTS IN CLOSED LOOP TRANSMISSION SYSTEMS
Filed July 25, 1950 4 Sheets-Sheet 1

Inventors
Francois H. Raymond
Boris A. Sokoloff
By Ralph B. Stewart
attorney

Sept. 10, 1957  F. H. RAYMOND ET AL  2,805,823
IMPROVEMENTS IN CLOSED LOOP TRANSMISSION SYSTEMS
Filed July 25, 1950  4 Sheets-Sheet 4

Inventors
Francois H. Raymond
Boris A. Sokoloff
By Ralph B. Stewart
attorney

United States Patent Office 2,805,823
Patented Sept. 10, 1957

2,805,823

IMPROVEMENTS IN CLOSED LOOP TRANSMISSION SYSTEMS

François Henri Raymond, Le Vesinet, and Boris A. Sokoloff, Paris, France, assignors to Societe d'Electronique et d'Automatisme, Paris, France, a corporation of France Application July 25, 1950, Serial No. 175,808

Claims priority, application France August 3, 1949

8 Claims. (Cl. 235—61)

The present invention relates to improvements in loop transmission systems, in which any controlled value, or output signal of the system, depends upon the difference between two other values. The invention thus relates to all systems of the servomechanism type as described in the "Fundamental Theory of Servomechanisms" by Dr. McColl: "A servomechanism is, in general any closed regulated system, or closed cycle control system, or closed loop control system that is controlled by a difference of two quantities."

The present invention has for its object to devise improvements in loop transmission systems of this type, in view of calculation, and for control, in such a way that the stability condition of the system can be assumed prior to the start of its operation. It more particularly concerns the loop transmission systems of the above stated type, comprising variable multiples, that is to say, in which several output signals are predetermined functions of several input signals which may be given arbitrary values, in such a way that the values of the former depend upon the differences between the known and defined input signal values and those of signals produced from the output signals.

Considering first the mathematical machines, it is known, for instance, according to Goldberg and Brown in "Applied Physics" vol. 19, April 1948, "An Electronic Simultaneous Equation Solver," how to construct calculators of the type operating according to certain calculating rules for solving linear equation systems with constant coefficients and comprising several unknown quantities. Such calculators are themselves established following a well-known technique: negative feed-back amplifiers.

However, their stability can be assured only by the procedure hereinafter described.

A problem having been set up by a mathematician in its matrical form, an operator registers on potentiometers assembled on a panel the matrix coefficients, the values of the matrix terms, and then puts the machine into motion.

If the loop transmission system appears not to be stable, the operator stops the machine and resets the problem by permutating the lines of the registering matrix. He then starts the machine again, and keeps on operating by repeated trials until a suitable stable condition is reached which then supplies the equations of the problems.

In the above-mentioned article it is stated, on page 341, first column, that the operator may use a "desk calculator," the nature, constitution, and operation of which are not stated, in order to pre-establish the stability. It is also stated that this stability may be obtained without calculation if the number of equations is not greater than half the number of linear equations with constant coefficients that the calculator can normally operate upon. However, it does not follow from these disclosures that the calculating machine of Goldberg and Brown, in its limited field, operates as a real servomechanism as it cannot be directly incorporated in the control channel of mechanical or hydraulic members.

An object of the present invention is to devise loop transmission systems capable of being used as calculators and as servomechanisms, which do not include the drawback of such limitations, and more particularly capable of being directly used as calculating networks for control functions in composite networks, because their stability condition may be pre-established by means incorporated in their own circuits.

Another object of the present invention is to enlarge the field of application of such loop transmission systems because of their ability to assume a stable condition prior to any start of operation and independently of the negative feed-back loops' complexity that they may incorporate, by giving such loop transmission systems every possibility to control several variables related to each other by the relations deduced from the integro-differential equations.

A further object of the present invention is to devise loop transmission systems that can be constructed from simple circuits of known arrangement. For example: potentiometer panels similar to those of the Goldberg and Brown calculator and their direct current amplifiers, telephone jacks as used in telephone networks, integrators and shunts of the usual type as described, for instance, in "Electronic Instruments" (Radiation Labs. Series of the M. I. T.), and function generators of the type made by General Electric Co., thus setting no particular problem for design or construction.

Denoting by $x_i (i=1, 2, \ldots, m)$ the whole of $m$ input signals, and by $y_j (j=1, 2, \ldots, n)$, the whole of $n$ output signals, the mathematical form of the action of a servo-mechanism with multiple variable quantities may be expressed either by means of relation:

(1) $\quad y_j = f_j(x_1, x_2, \ldots, x_m)$, or $y_j = f_j(x_i)$ if it is assumed that each of the $y_j$ quantities is a definite function of the $m$ quantities $x_1$, or by means of relation:

(2) $\quad x_1 = g_1(y_1, y_2, \ldots, y_m)$, or $x_1 = g_1(y_j)$ if it is assumed that quantities $y_j$ satisfy to $m$ implicit relations of values $x_1$, or, last and more generally, by means of relation:

(3) $\quad g_u = (y_j) = f_u(x_i)$ in which $u = 1, 2, \ldots, r$, the operation of such a servomechanism with multiple variable quantities being, of course, only possible, if to a set of $m$ input signals $x_i$, there corresponds only one set of $n$ output signals $y_j$, the reciprocal not being necessarily true.

A servo-mechanism according to the present invention, having to deliver a set of $n$ output signals $y_j$ when $m$ input signals $x_i$ are applied to it, in order to satisfy above mentioned relations, generally comprises, means to derive from the $m$ input signals $x_i$, a set of n signals $X_i$ defined by the relation $X_i = f_i(x_i)$, means to derive from the $n$ output signals $y_j$, a set of $n$ signals $Y_j$, defined by the relation $Y_i = g_j(y_j)$, means to compare both sets of signals $X_i$ and $Y_i$, with corresponding indexes, and to generate as a result of this comparison, a set of $n$ error signals $E_i$, means to control the $n$ output signals $y_j$ in accordance with the values of said error signals $E_i$, so as to modify the values of said output signals in such a manner that the values of signals $Y_i$ tend towards the values of signals $X_i$, and means to ensure, in every condition of expression of above-cited relations (1) to (3), the balance stability of the whole servo-mechanism.

Figure 1:
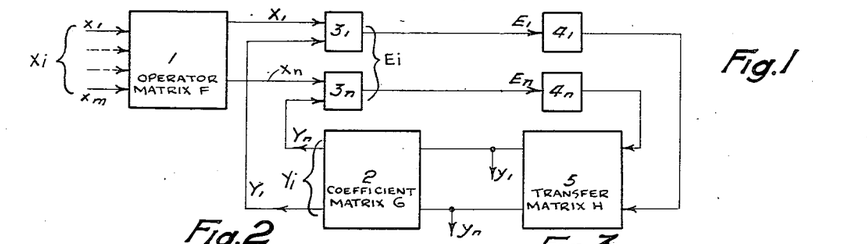

A servo-mechanism according to the present invention is diagrammatically shown on Fig. 1 of the appended drawings. In this figure at 1 are means which, from the $m$ input signals $x_i$, derive the $n$ signals $X_i$; at 2 the means which, from the $n$ output signals $y_j$, derive $n$ signals $Y_j$; at $3_1$ to $3_n$ are shown the means which, through comparison of signals $X_i$ and $Y_i$ derive error signals $E_i$ which are transferred to controlling means $4_1$ to $4_n$ to change according to their values, the values of signals $y_j$, so that the set of error signals $E_i$ tend towards zero; at 5, at the output of said subordinating means $4_1$—$4_n$, are illustrated the means which insure the balance stability of the whole servo-mechanism and, as a modification, another possible location for said stabilizing means is between means $3_1$ to $3_n$ for generating the error signals $E_i$, and means $4_1$—$4_n$ for controlling output signals $y_j$ in accordance with said error signals $E_i$, see Figure 4. The input signals applied to operator matrix 1 will be direct current voltages when the system is used as a calculating device, although they may be alternating current voltages of constant frequency and controllable amplitude.

In the following specification these various means shall be conveniently designated by means of the following expressions:

1—"operator" matrix, or matrix F
2—"coefficient" matrix, or matrix G
$3_1$—$3_n$—divergence discriminators
$4_1$—$4_n$—(forming together a unit) "amplifier" matrix, or matrix A
5 (or 5')—transfer matrix, or matrix H However, elements $4_1$—$4_n$, notwithstanding the adopted designation containing the term "amplifier," may as well consist in servo-motors as in amplifiers, depending on the nature of the servo-mechanism. When these elements are static amplifiers, they merely repeat the error signals with possible amplification. Where servo-motors are used, the motors respond to the error signals and substitute another signal, as by the operation of a slider on a potentiometer to produce an output voltage proportional to the error signal, or may control the value of an alternating signal which would be rectified to produce signal $y_j$.

In fact, these designations relate to the writing of the vector relation in operational computation which defines, more particularly but in a non-limitative manner, the servo-mechanism shown in Fig. 1, then considered as in the case in which it must follow the laws of linear physical systems. In this case it may be assumed that each function $y_j = f_j(x_i)$ is a linear function of the $x_i$, or represents a linear operator applied to the $x_i$. It may thus be said that the whole of the $y_j$ defines a vector $y$ in the functional $n$ dimensional space which is the transformed curve of vector $x$ which represents the whole of $x_i$ in the $m$ dimensional space.

If $\vec{\eta}$ is the vector of the components of the Laplace's transformed curve of the $y_j$, and if $\vec{\xi}$ is the vector of the component of the Laplace's transformed curves of the $x_i$, and through analysing the diagram shown in Fig. 1, after having gone through all calculations, the following expression is obtained (4) $\qquad \vec{\eta} = [I_n + AH'G]^{-1} AH'F \vec{\xi}$ in the case of the transfer matrix being inserted between $3_1$—$3_n$ and $4_1$—$4_n$, and the expression:

(5) $\qquad \vec{\eta} = [I_n + HAG]^{-1} HAF \vec{\xi}$ in the case of the matrix being inserted at 5, transition from one relation to the other being obtained through permutation of matrixes H (transfer) and A (amplifier), or in other words, through associating two matrixes H and H' such that $HA = AH'$; but A being, in fact, a diagonal matrix, $H = H'$ when all elements of diagonal A are equal, which is the most usual case in the use of servo-mechanisms according to the present invention, principally in their applications to mathematical computation of algebraic integro-differential equation systems.

Now, such designations shall also relate, when the present invention is put into practice, to sub-sets of corresponding functions, as it is foreseen, according to a further feature of the present invention, to obtain effective embodiment of matrixes F, G and H through circuit arrangements (the term circuit being understood in its most general meaning, and not being limited to its electrical meaning) such as will now be described with reference to the appended Figs. 2–10 in which.

Figure 2:
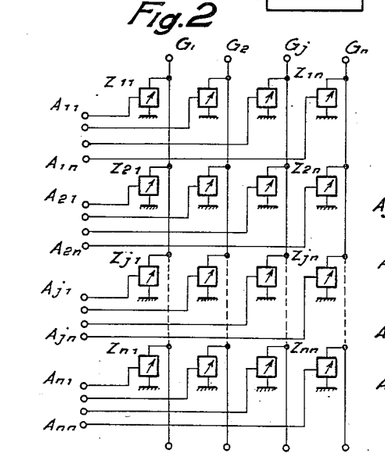
Fig. 2 shows the general arrangement of a matrix network useful in Figure 1 according to the present invention.

In a servo-mechanism according to the present invention, each matrix consists in a multipole the $p$ input terminals and the $q$ output terminals of which are interconnected through impedance networks. In Fig. 2 the arrangement of such a device comprises leads or feeders $G_1, G_2, \ldots G_j, \ldots G_n$ embodying the columns of the matrixes, in parallel to which are connected impedances or impedance networks $Z_{11}, \ldots Z_{n1}$, to feeder $G_1$, $Z_{1n} \ldots Z_{nn}$ to feeder $G_n$, each set of generalized impedances $Z_{11} \ldots Z_{1n}, Z_{21} \ldots Z_{2n}, \ldots Z_{j1} \ldots Z_{jn}, \ldots Z_{n1} \ldots Z_{nn}$, embodying a line of the matrix. Any generalised impedance Z is adjustable and each of said generalized impedances is connected to a terminal A, terminals A being distributed in groups, as shown, by rows, such as $A_{11}, \ldots A_{1n}, \ldots A_{21}, \ldots A_{2n}, \ldots A_{j1} \ldots A_{jn} \ldots A_{n1} \ldots A_{nn}$.

The numbers of columns and rows being the same, say $n$, in this matrix, said matrix is consequently a square matrix. However its structure would be analogous if it were rectangular, such as comprising, for example, $n$ columns and $m$ rows.

The connection of impedances Z to feeders G may be made either by means of direct connections or by means of inductive coupling. In the latter case, for example, feeders G may consist in primary winding of transformers with multiple secondary windings ($n$ for a square matrix) incorporated in impedances Z. The adjustment or regulation of each of impedances Z may be effected not only through varying the value of the impedance or of certain of its elements, but also through inserting and/or cutting out certain of their impedance elements, usually passive ones (inductances, capacitors, resistors, in electric networks and the equivalents of these quantities in mechanical systems); said passive elements may also, at least as regards certain of them and in certain cases, be active impedance elements (electron tubes and associated circuits, as, for instance in the "amplifier" matrix, which however is reduced to a mere diagonal, or servo-motors in other forms of the system). Moreover, while such an adjustment is commonly effected with the hand at starting, it is quite clear that it may also be modified in the course of operations, and as a function of predetermined data or of results obtained during the operation. This will be illustrated with reference to Fig. 10.

Figure 3:
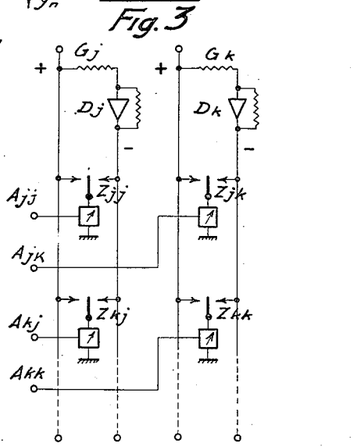
Fig. 3 shows a modification of such a network, to allow the insertion of negative coefficients.

Moreover and in order to allow the display of negative values in such matrixes, it is also provided, according to a further feature of the present invention, as diagrammatically shown in the detail representation of Fig. 3, to duplicate leads or feeders $G_1$–$G_n$ of the columns, one lead of each pair, marked (+) in the drawing, being directly connected to the corresponding input terminal, and the other lead of the pair being connected to said terminal through a polarity reversing amplifier D, with a gain of unity value, and being thus marked with the minus sign (—) in the drawing. In such a case, the connection of each impedance Z is made on either of the leads of its pair by means of a reverser contacting device inserted, as illustrated, in the corresponding input channel.

Such a matrix may, of course, be used for the embodiment of any one of matrixes F, G and H. However, if the arrangements of matrixes F and G (more particularly their adjustment) are determined directly as functions of the problem to be solved, there remains to define the nature of transfer matrix H in order to provide a stable servo-mechanism. Generally, matrix H may be chosen of whatsoever desired nature, provided that it is related to the structure of "coefficient" matrix G in such a manner that matrix HG has no roots in $\rho$ ($\rho$=complex pulsation, of which above-cited Laplace's transformed curves $n$ and $\xi$ are functions) in half plane R $(\rho)>0$, such as defined in the conventional theory of servo-mechanisms.

Moreover, in practice and according to a feature which is peculiar to the servo-mechanisms of the present invention, it is provided that transfer matrix H, independently of its location at 5 or 5', shall be chosen in the group of the permutation matrixes, derived by row or column permutation from unit matrix $I_n$ (so designated in the above relations 4 and 5). It will thus consist, in fact, in connections to be established by the user either between the outputs of the $n$ divergence discriminators and the inputs of the $n$ amplifiers (or servo-motors), see Figure 4, or between the output of these $n$ amplifiers or servo-motors and the inputs of the matrix of coefficients G as shown in Figure 1.

These connections are preferably in the form of a multipole with $n$ columns and $n$ rows, connectable by means of switches and the selective operation of said switches will ensure the stability of the whole servo-mechanism. Owing to the fact that, if $n$ linearly independent input signals are applied to the terminals of said matrix, there must be obtained $n$ linearly independent output signals, only one of these switches is to be closed, for each row and column. Moreover, the choice of said switches is made according to the two following experimental rules, which avoid all groping.

(a) Matrix H should be such that, the structure of matrix G having been adjusted for the desired operation, one should obtain:

$$|\det HG| > 0$$

(b) That, in such conditions, the terms of the diagonal of matrix HG be of higher value than those of the row and column in which they are located.

It may thus be seen that in loop transmission systems according to the invention, the problem set (setting into equation) in its matical form by the mathematician, will be directly registered by the operator on a potentiometer panel constituting the coefficient's matrix. After this registration and prior to starting the servomechanism, the operator has the necessary means of pre-controlling the stability of the servomechanism in relation to the problem set down, by closing selectively the switches of the said matrix H according to the above-mentioned rules.

In practice, as it will be stated further, this matrix is made of contacts of the usual telephone jack type.

Figure 4:
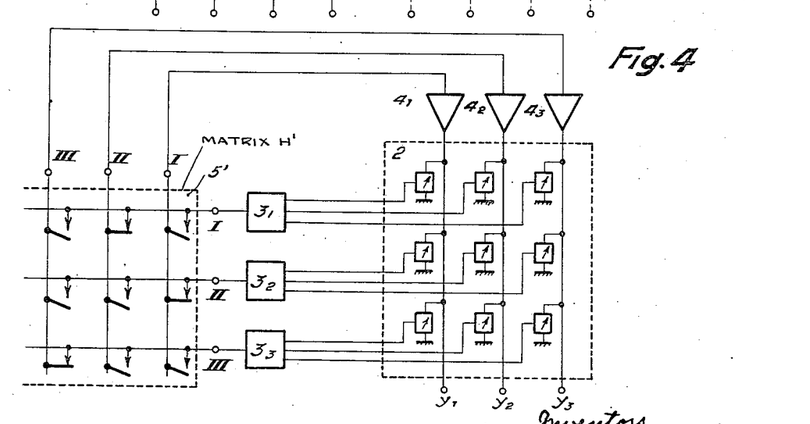
Fig. 4 illustrates an embodiment of the present invention as applied to the resolution of a system of three equations and with the transfer matrix located between the divergence discriminator and the amplifier matrix.

In such cases the stability conditions will thus be easily obtained. For instance, assuming that the servo-mechanism diagrammatically shown in Fig. 4, the "coefficient" matrix 2 of which is of the order 3, is applied to the simultaneous resolution of the three following linear equations:

(6) $\quad 0.4y_1+0.8y_2+0.7y_3=0$
$\quad\quad\ 0.9y_1+0.6y_2+0.2y_3=0$
$\quad\quad\ 0.5y_1+0.5y_2+0.9y_3=0$ (as it is quite evident that any servo-mechanism with multiple variable quantities according to the present invention may be directly used for such purpose) impedances Z of matrix 2 will be individually adjusted to the value of the coefficients of the y, for each row and column; matrix 5' being taken in the group of the permutation matrixes, account being taken of the above-enunciated rule (b), matrix HG will be:

(7) $\quad HG = \begin{vmatrix} 0.8 & 0.4 & 0.7 \\ 0.6 & 0.9 & 0.2 \\ 0.5 & 0.5 & 0.9 \end{vmatrix}$ and consequently matrix H will have the following structure:

(8) $\quad H = \begin{vmatrix} 0 & 1 & 0 \\ 1 & 0 & 0 \\ 0 & 0 & 1 \end{vmatrix}$ Consequently, in fact, to ensure the stability of this computer, it is necessary, as shown, to close the switch connecting the input to column I of matrix 5' to row II, the switch connecting column II to row I and the switch connecting column III to row III, strictly according to the table of matrix H.

The application of rules (a) and (b) to the example given immediately above may be further explained as follows: Rule (a) establishes the requirement that the product of the determinant values of matrices G and H shall be greater than zero, and therefore of a positive value. Matrix G corresponds to the arrangement of the coefficients in the equations given at (6). By rearranging matrix G in accordance with rule (b), so that the diagonal values are greater than the other values in the corresponding rows and columns, the matrix HG is obtained, as shown at (7). The value of the determinant of matrix G for the relations given at (6) is a negative value, that is, $-0.287$. Now, in order to satisfy rule (a), matrix H must be of a form to have a determinant of negative value, so that the product of the G and H determinant values shall be positive and greater than zero. By selecting matrix H of the form shown at (8), the determinant value of this matrix will be $-1$ and rule (a) will be satisfied.

Figure 5:
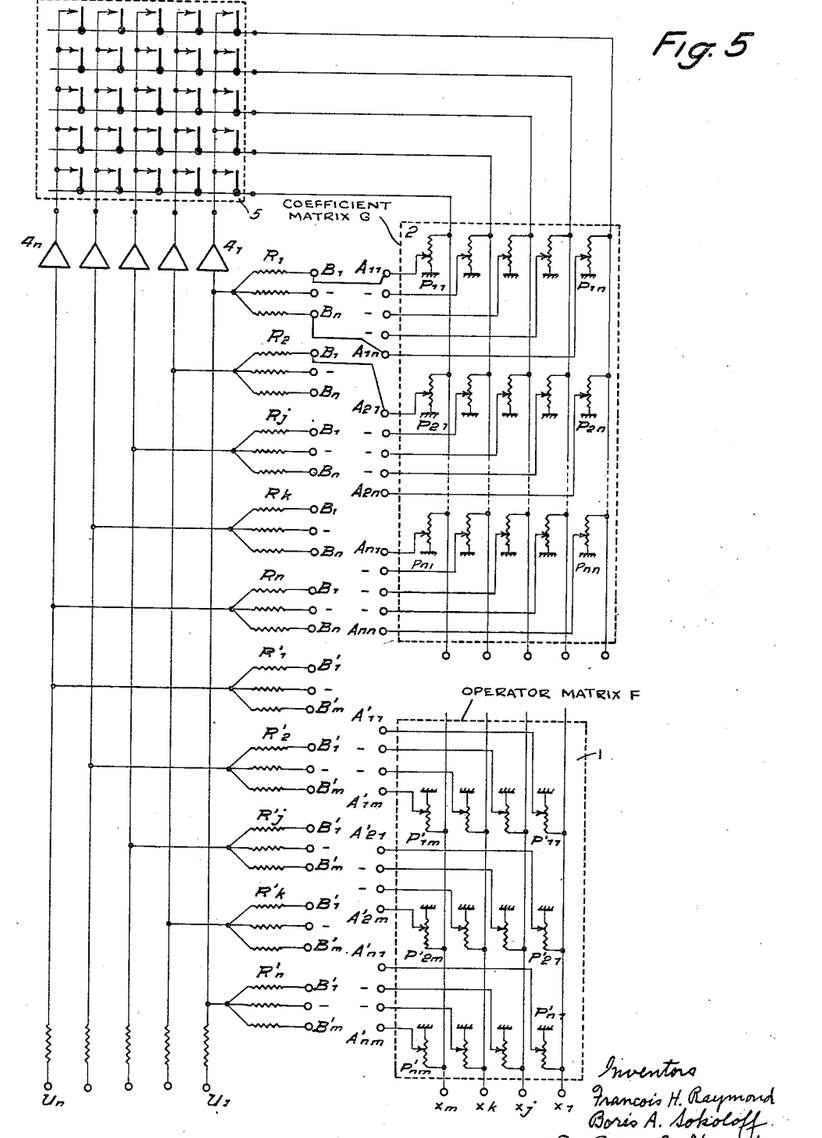
Fig. 5 shows a general diagram of a servo-mechanism such as a computer, according to the present invention.

Fig. 5 shows in a more general manner the arrangement of a servo-mechanism with multiple variable values according to the present invention, in the case in which transfer matrix 5 is taken in such a form and, more particularly, in the case in which impedances Z consist of impedance elements with potential dividing taps, thus diagrammatically shown as potential dividers $P_{11}$ ... $P_{1n}$, $P_{21}$ ... $P_{2n}$, ... $P_{n1}$, ... $P_{nn}$, for "coefficient" matrix 2 and as potential dividers $P'_{11}$ ... $P'_{1m}$, $P'_{21}$ ... $P'_{2m}$, $P'_{n1}$, $P'_{nm}$, for "operator" matrix 1. This is because matrix 2 is a square matrix, but matrix 1 may be rectangular, to deliver $n$ signals $X_i$ for $m$ input signals $x_i$ ($i=1, 2 \ldots m$).

The cursors or movable contacts of said potential dividers are individually connected to terminals A, of corresponding indexes, through which input signals $X_i$ and signals $Y_i$ derived at 2 may be distributed to any terminal $B'_1$–$B'_m$ or $B_1$–$B_n$, respectively, of star networks of impedances $R'_1$–$R'_n$ and $R_1$–$R_n$ the common terminals of which are connected, with corresponding indexes, to amplifiers $4_1$–$4_n$ (or servo-motors) the outputs of which are connected to the columns of transfer matrix 5, thus applying to them $n$ controlling signals generated from the error signals delivered through the comparators individually consisting in network pairs $R_1$—$R'_1$, ... $R_n$—$R'_n$ and one of channels $U_1$ ... $U_n$ provided for the possible application of reference signals (second member value signals, in mathematical machines). It will be understood that terminals A for the row of optentiometer $P_1$ will be connected to correspondingly marked terminals B of star network $R_1$, and likewise for the other rows of potentiometers. While star networks $R_1$, $R_2$, etc. are shown with only three arms, they will have as many arms as there are potentiometers in the row assigned to each network. The subscript associated with each A terminal identifies the B terminal to which it is to be connected. The first digit of the subscript identifies the network and the second digit identifies the terminal of that network. For example, terminal $A_{11}$ will be connected to the $B_1$ terminal of network $R_1$, and terminal $A_{1n}$ will be connected to the $B_n$ terminal of the same network. Terminals $A_{21}$ to $A_{2n}$ will be connected to the corresponding terminals of network $R_2$, and so on. The two networks $R_1$ and $R'_n$ connected to the input of amplifier $4_1$ constitute the divergence discriminator $3_1$ in Figure 1, and the networks $R_n$ and $R'_1$ correspond to $3_n$ in Figure 1. While the impedance elements of each branch of any star network have been shown as resistors, it is to be understood that such elements may be complex, such as inductance, capacitor and resistor combinations, for the purpose of applying certain modifications to signals from either of matrixes 1 or 2, for instance for the purpose of integrating them (by means of a resistor-capacitor circuit or network well known for such purpose).

Through selectively closing one switch per row and column of transfer matrix 5, $n$ signals linearly independent but corresponding to the $n$ input signals of which they are linear functions, are generated and directed through the connections established to the columns of the "coefficient" matrix. These signals are then in fact, the signals representing the $n$ output signals $Y_i$ which, in the servo-mechanism, correspond to the $m$ input signals $x_i$ from which they were derived through the operation of the above-described multiple loop.

The operation of a loop transmission system for calculating or controlling purposes according to the diagram of Fig. 5 comprises the following steps:

(a) The coefficients of the equation system (linear in the present case) to be solved, obtained by dividing these equations by the numerical coefficient of the second member of the greatest module, is registered on matrix 2 through individual adjustment of potentiometers P.

This operation has been performed by the mathematician so that the operator actuates potentiometers P to register the values (less than unity) of these coefficient modules that he reads on the list where the problem is set. At the same time, the operator actuates the one-pole switches to connect the positive or negative feeder to these potentiometers, according to the signs (+) and (−) of the coefficients written down on the list handed over by the mathematician.

(b) The second numerical members are, if needed, registered on corresponding potentiometers which are not illustrated on the diagram but their voltages are applied to terminals $U_1$ to $U_n$.

(c) By adjustment of potentiometers P' of the operator matrix, the initial values of the reference voltages to be applied upon the feeding lines of amplifiers $4_1$ to $4_n$ at terminals $X_1$ to $X_m$, receiving or not receiving a voltage step, are chosen.

(d) Connections are established between the potentiometers of matrix 2 and terminals B of the star networks unless, as will be seen hereinafter, these connections were pre-established or more precisely pre-tuned according to a particular method for carrying the invention into practice.

(e) Connections are established between the outputs of amplifiers 4 and feeders of matrix 2 according to the above-stated rules by selectively closing the switches of matrix 5.

(f) Lastly, the system is fed through applying voltages onto terminals $X_1$—$X_m$ and $U_1$—$U_n$.

The loop transmission system thus established oscillates and reaches a stable equilibrium position by the preceding operation. The voltages appearing at the feeder terminals of matrix 2 then provide the resolution values of the calculating or controlling problem. These values can be measured in case of mathematical machines; or the voltages may be applied onto control members in case of servomechanisms.

Matrix H (or H'), illustrated by panel 5, Fig. 5, may be arranged on a switch panel exactly corresponding to the drawing. However, for economical purposes, only one switch may be provided for each amplifier output, this switch being made of a jack connected permanently to the output of a particular amplifier and secured into sockets insuring the connection between the vertical feeders of matrix 2 and the potentiometers disposed along the path of these feeders, because of the fact that the output of only one amplifier must be connected to one of these feeders and that only one of the feeder potentiometers must be line connected to the input of the star network of a particular amplifier.

This is the same as directly connecting, in the diagram of Fig. 5, each of the terminals A of matrix 2 to terminal B of the corresponding index in the star network, but insuring connection of the feeding terminals of potentiometers P to the feeders through the sockets of a jack in such a way that these potentiometers would be selectively connected to the feeders only when a jack connected to an output lead of an amplifier is plugged into one of these sockets. In a more precise way, the lead connected to the output of amplifier $4_1$ will always be plugged into one of the sockets of the potentiometer $P_1$ line, the lead connected to the output of amplifier $4_2$ will always be plugged into one of the sockets of the potentiometer $P_2$ line, and so on, the setting of matrix H being performed by the choice of the feeders, so that the output of the amplifiers will never be connected to more than one feeder in matrix 2 and, reciprocally, no one of these feeders will ever be connected to the output of more than one amplifier.

Figure 6:
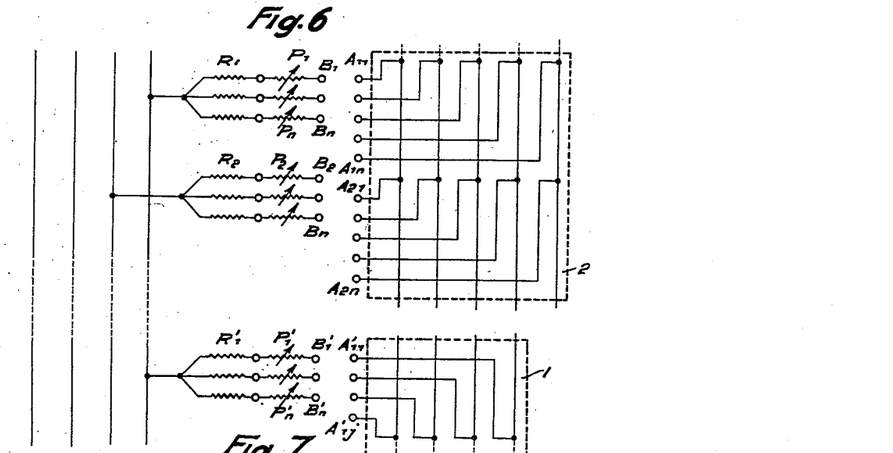
Fig. 6 shows a partial modification of the diagram shown in Fig. 5.

According to the embodiment modification diagrammatically shown in Fig. 6, matrixes 1 and 2 could consist only in lead networks, with the above-described arrangement with reference to a matrix structure, all impedance elements being however omitted, as said elements have been transferred to the branches of star networks $R_1$—$R_n$ and $R'_1$—$R'_n$. Such an arrangement, the operation of which is not appreciably different from that of the arrangement shown in Fig. 5, may provide certain advantages in case where the star networks impedances are chosen with highly different values, for some of them, from the values uniformly adopted for the remaining impedances. In the general case the impedances of each network R were given, in fact, identical values.

Figure 7:
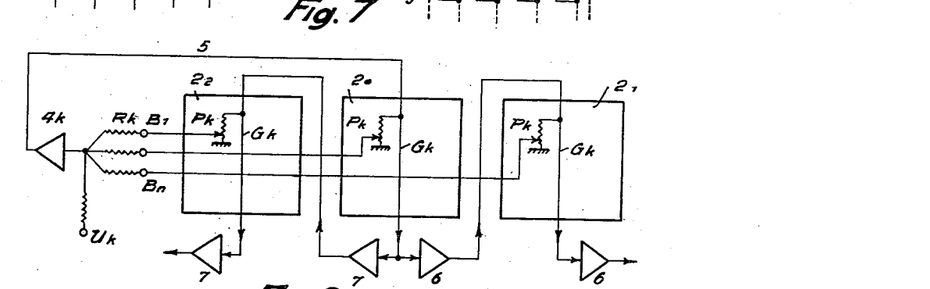
Figs. 7 and 8 show two arrangement modifications of servo-mechanisms according to the present invention, providing said servo-mechanisms with multiple loops and, more particularly in Fig. 8, with non-linear characteristics.

In a servo-mechanism arrangement such as shown in Fig. 5, matrix G (or 2) is realized in one unit and, consequently there is only one set of controlling loops involved in the servo-mechanism. Now, it is well known that a square matrix of order $n$, may be decomposed into as much as desired partial square matrixes of a submultiple order of $n$. In Fig. 7, which is now to be described, three partial matrixes $2_0$, $2_1$ and $2_2$ are to be represented to explain in a convenient manner the application of a further feature of the present invention according to which, through taking advantage of this subdivision possibility, it is possible to establish more complex servo-mechanisms through simultaneously realising in them various sets of controlling loops in order to fulfill different controlling functions, some of which may then be such that output signals Y1—Yn be made to provide among each other relations defined by other means than the provision of impedance networks R.

According to this characteristic of the present invention and "coefficient" matrix 2 being embodied in $p$ different matrixes, of order $p$ ($p/n$ being an integral number), additional means are provided for the realisation of controlling loops extending in succession through two or more divisional matrixes. Particularly, as illustrated in Fig. 7, such means consist in connections ensuring either the signal integration through channel 6, or the differentiation through channel 7, said integration or differentiation being possibly gradually repeated. A signal $y_k$ from amplifier $4k$ and flowing first through matrix $2_0$ through a lead 5 of the transfer matrix may, of course, while flowing through column $G_k$ of said matrix, be collected to be sent back to a terminal of a star network $R_k$, but also, once integrated through connection 6, said signal is applied to column $G_k$ of matrix $2_1$ and, while flowing through said column, is brought back, in its integrated form, to another terminal of network $R_k$ (or of another one), and so on, through a gradual integrating process. It will be likewise, in a gradual differentiation, if said signal is additionally or alternatively directed to differential connection 7, through matrix $2_2$, and so on. Preferably however the integrating or differentiating operations are to be provided separately. It is unnecessary to describe in detail the structure of other connections 6 and 7, many integrator and differentiator embodiments being known in practice.

Figure 8:
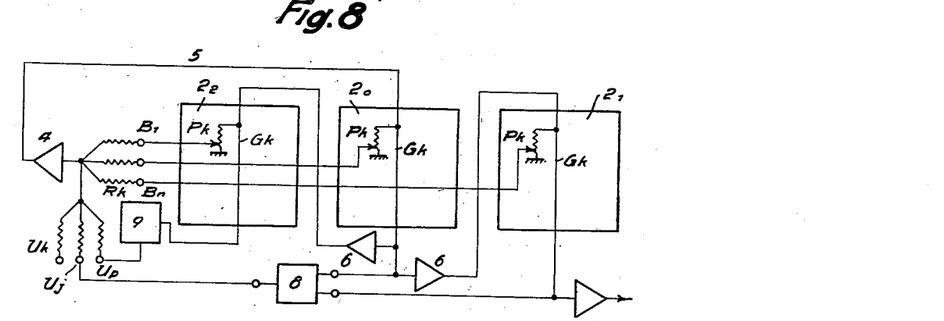

According to a further feature of the present invention, advantage is additionally taken of this possibility of subdividing the matrix for further operations, particularly for multiplying two (or more) signals, or also to derive, while the servo-mechanism is operating, particular functions of the controlled signals. In Fig. 8, in which the conventional illustrating rules of Fig. 7 have again been observed, a loop is diagrammatically shown which, through the outputs of matrixes $2_0$ and $2_1$ provides a multiplication of the corresponding output signals by bringing said signals back to multiplying member 8, the output signal of which is brought back into comparison star network $R_k$ (it could as well be brought back into another matrix of coefficient $2_j$). In the output of the column shown of matrix $2_2$ at 9 a generator for complex functions is shown (such as trigonometric, hyperbolic, logarithmic, exponential, or experimental function tablets) the output of which is also shown as also re-injected into star network $R_k$, but may also be directed to one column input of another matrix. Such function generators are known, for instance cathode ray tube translators, or complex impedance network tables, which may be "read" by means of a signal from the matrix in question.

However, it must be well understood that an output signal from one of the divisional matrixes (or from the general matrix) may multiply an input signal or generate a function, then used as an input signal.

The integration or differentiation circuits or boxes are of a usual type and consist of high-gain amplifying stages with local negative feed-back circuits, capacity for integration and resistance for differentiation.

Input to the amplifiers takes place through a high-value resistor. Insertion in the circuit of these connecting boxes between two sub-matrixes is taken care of by double-pole switches, one pole for insertion into the circuit and the other pole for breaking the circuit. These switches are operated by the operator who prepares the starting of the servomechanism between preparatory operations, as above mentioned. Putting them into circuit does not interfere with the control of stability.

It is the same process for the multiplying circuits or the arbitrary function generators of Fig. 8, which are well-known circuits, in or out of circuit when the problem is being set. No adaptation of the circuits, other than their establishment for the voltages to be operated upon in the loop transmission system considered, is necessary.

In the preceding, servo-mechanism or mathematical machine embodiments have been considered comprising as many physical members as there are particularized functions to be fulfilled. With reference to further figures, practice modifications will now be examined, providinng means to reduce the number of such physical members, first by making use, in such servo-mechanisms and machines, of a multiplex operation process, and, second, by using a program member or circuit.

Figure 9:
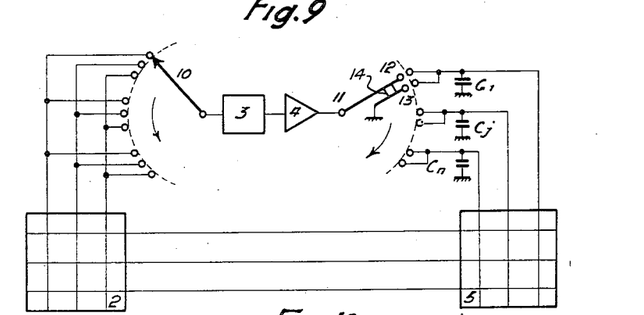
Fig. 9 shows an embodiment modification of above-mentioned servo-mechanisms.

According to a first practice feature relating to the multiplex process, as shown in Fig. 9, only one high gain amplifier 4 is made use of receiving the output signals of only one comparator or divergence discriminator 3. The connection between input of said divergence discriminator 3 and channels or columns of "coefficient" matrix 2 (for the sake of simplification matrix 1 has not been shown) is made by means of a switch 10, such as a rotating switch, which may be of either electromechanical or electron type depending on circumstances, with $n^2$ contacts, grouped in units of $n$ contacts connected to the $n$ lines of the "coefficient" matrix. The output of amplifier 4 is distributed, by means of a switch 11, such as a rotating switch, to $n$ capacitors $C_1 \ldots C_n$ in parallel to the $n$ leads connected to transfer matrix 5 and which ensure the "memory" of the data successively applied through switch 11 to these channels. The rotation velocity of switch 11 with reference to that of switch 10 is such that the $n$ signals collected at a group of terminals ($n$ in number) of switch 10 and applied to the $n$ impedances of the only star network 3, be fed to each of terminals or contacts of switch 11, thus correspondingly charging capacitors C. However, as each capacitor C must be in a discharged condition when energized through amplifier 4, provision is made to give the brush of said switch the structure shown, by means of two blades 12 and 13, blade 13 which passes first on the capacitor terminals being grounded and being insulated by means of an insulating support 14 from blade 12 through which the signals from the amplifier flow effectively. In a cathode beam switch it would be the input contact of each capacitor which would be duplicated, the beam applying first a ground potential to the first contact of each pair, and then applying the signal voltage to the second contact. The operation of such an arrangement will be easily understood from the above disclosure and from previous disclosures well known in the art of multiplex channel distributing systems.

Of course, as a modification, the divergence discriminators may be kept to the number of $n$, switch 10, then comprising only $n$ contacts serving for timing the application of their output signals to amplifier 4, which is shown at $3_1$—$3_n$ in dotted lines, for the whole of the discriminators. As above described, the location of the transfer matrix may then be fixed upstream or ahead of the amplifier if $n$ divergence discriminators are used.

Figure 10:
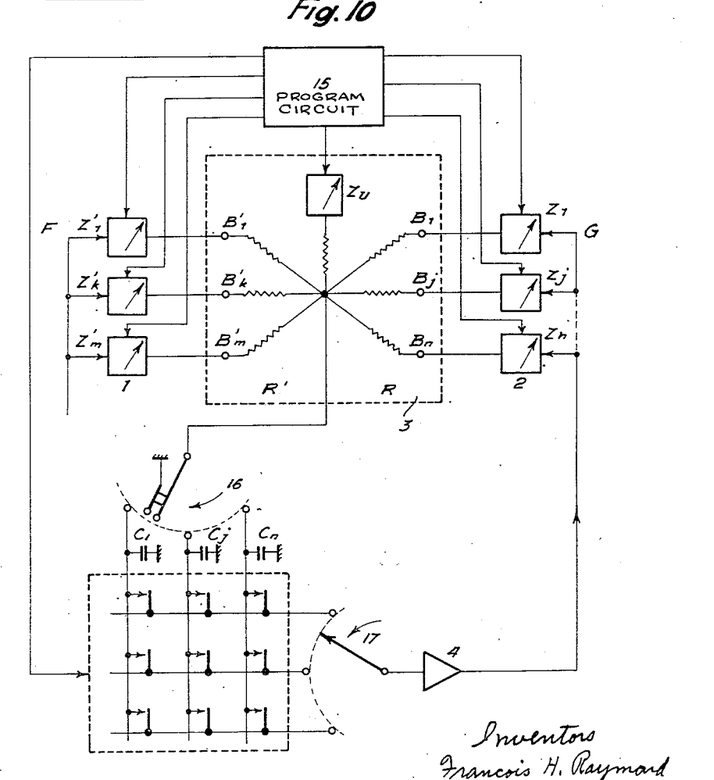
Fig. 10 shows another embodiment modification making use only of linear networks for representing the matrixes, due to the insertion of a so-called program circuit.

In the arrangement provided according to a further practice modification of the present invention, the servo-mechanism or computing equipment is characterized by the fact that said equipment operates from a program circuit 15, which provides the realisation or embodiment of matrixes 1 and 2 each my means of only one column, said columns being associated to $m$ and $n$ parallel impedance elements or networks, respectively, the above mentioned embodiment being then obtained through modifications which are discontinuous functions of time of impedance values $Z'_1 \ldots Z'_m$, matrix F and $Z_1 \ldots Z_n$, matrix G. The outputs of these impedances or impedance networks are permanently connected to the terminals of star networks R' and R, respectively, which, together with impedance $Z_u$, also adjustable from program circuit 15, form an embodiment of the whole of divergence discriminators 3. In the drawing the impedance of star networks R and R' are assumed to be constant and predetermined.

The output of said discriminator 3, which then delivers in succession the divergences from the desired values of variable quantities $y_i$ is connected to a distributor 16, of the same type as switch 11 shown in Fig. 9, which transfers them to corrector networks or transfer matrix 5 (matrix H), through storing them in capacitors $C_1$ to $C_n$, in such a manner that said transfer network may convert any set of divergence or error signals $E_i$ into a set of signals which are linear functions of said signals $E_i$ at the contacts of a switch 17, which successively transmits them to amplifier 4, the output of which is applied to the single column of matrix 2 (matrix G). In such cases, it is then easily possible to change the structure of matrix H in the course of operations, from program circuit 15. Moreover, it is clear that program circuit 15 (a complex set of adjusting signal generators, controlled by means of a clockwork) could also be influenced through metering signals collected at certain places in the loops, (as indeed, matrix G is by no means limited to $n$ impedances derived from a single lead but, as in preceeding cases, it is evidently possible to subdivide it for the above-mentioned purposes) either at the outputs of matrixes G or at the output of amplifier 4, for instance.

From the preceding it may thus be correctly deduced that the present invention, in all embodiments and modifications, also comprising the many technical modifications and alterations which may be applied to the described arrangements, within its scope, provides the realisator with all sorts of servo-mechanisms and mathematical computor or operator devices, operating in a particularly versatile and stable manner, through directly applying the above defined features.

On the other hand, in every application class, it is to be well understood that there is no necessity of assuming that the invention be limited to the embodiment of systems with unitary physical structures. On the contrary, in all applications in which it may be necessary, the above-mentioned functions may be fulfilled by means of wire or by wireless means, by means of direct or carrier frequency transmission, within the scope of the present invention.

It is moreover to be well understood that the present invention is not limited to the introduction of quantities into the "operator" matrix, or the "coefficient" matrix—be it unitary or subdivided—through manual controls, but that such quantities may be introduced directly from results of measuring the operational data of the most various equipments, directly or after converting them preferably into electric signals.

What we claim is:

1. In a mutiple looped transmisison system the combination of a plurality of adjustable impedances arranged in a plurality of rows and columns to form a matrix network, means connecting the input terminals of said adjustable impedances in each column to a common input terminal individual to each column, a plurality of signal-combining networks equal in number to the number of rows of adjustable impedances in said matrix network, each of said combining networks having an output terminal and a plurality of input terminals, means connecting the output terminals of said impedances to the individual input terminals of said signal-combining networks, a plurality of repeaters equal in number to the number of columns in said impedance matrix network and each of said repeaters having input and output circuits, and a transfer matrix comprising a plurality of switches for establishing a single straight-through connection from each output terminal of said combining networks to an individual input terminal of said columns, each straight-through connection being completed through an individual one of said repeaters.

2. A transmission system according to claim 1 wherein said transfer matrix is interposed between said combining networks and said repeaters.

3. A transmission system according to claim 1 wherein said transfer matrix is interposed between said repeaters and said variable impedances.

4. A transmission system according to claim 1 wherein said matrix network comprises a coefficient matrix G and said transfer matrix is designated matrix H and is constructed in relation to matrix G so that the determinant $|HG|$ is positive and the terms of the diagonal matrix are, to the maximum extent, the largest terms in their own lines and columns in the matrix.

5. A transmission system according to claim 4 wherein the connections completed through said transfer matrix connect only one column of the transfer matrix to each row of the transfer matrix, and the relation (det, $HG$)$>0$ is satisfied, and the terms of the diagonal matrix HG shall be of higher value than those of the row and of the column in which said terms are located.

6. In a multiple looped transmission system the combination of a plurality of voltage sources of adjustable values arranged in a plurality of rows and columns to form a matrix network, means connecting one terminal of each voltage source in each column to a common terminal individual to each column, a plurality of signal combining networks equal in number to the number of rows of adjustable voltage sources in said matrix network, each of said combining networks having an output terminal and a plurality of input terminals, means connecting the other terminals of said voltage sources to the individual input terminals of said signal-combining networks, a plurality of repeaters equal in number to the number of columns in the said matrix network and each of said repeaters having input and output circuits, and a transfer matrix comprising a plurality of switching means for establishing individual connections from the output terminals of said combining networks to different input terminals of said columns, each individual connection being completed through an individual one of said repeaters.

7. A transmission system according to claim 6 and including means for selectively changing the polarity of each of said voltage sources.

8. In a multiple looped transmission system, the combination of three components connected in a closed loop, one of said components comprising a plurality of adjustable impedances arranged in a plurality of rows and columns to form a coefficient matrix network G, the impedances in each column having a common input terminal individual to each column, and each impedance having an individual output terminal; the second of said components comprising a plurality of signal-combining networks equal in number to the number of rows of adjustable impedances in said matrix network, each of said combining networks having an output terminal and a plurality of input terminals; the third said component comprising a plurality of repeaters equal in number to the number of columns in said impedance matrix network and each of said repeaters having input and output terminals; and a transfer matrix H interposed in said loop between two of said components, said transfer matrix comprising a plurality of switches for permutating single straight-through connections between each terminal of $n$ output terminals of one of said two components and an individual terminal of $n$ input terminals of the other of said two components, said connections being arranged so that the determinant $|HG|$ is positive in value and the greatest terms of matrix HG are on the diagonal in said determinant.

References Cited in the file of this patent

UNITED STATES PATENTS

| | | |
|---|---|---|
| 2,428,811 | Rajchman | Oct. 14, 1947 |
| 2,428,812 | Rajchman | Oct. 14, 1947 |

(Other references on following page)

UNITED STATES PATENTS

| | | | |
|---|---|---|---|
| 2,454,549 | Brown et al. | Nov. 23, | 1948 |
| 2,455,974 | Brown | Dec. 14, | 1948 |
| 2,459,106 | Hardy et al. | Jan. 11, | 1949 |
| 2,537,427 | Seid | Jan. 9, | 1951 |
| 2,543,650 | Walker | Feb. 27, | 1951 |
| 2,613,032 | Serrell | Oct. 7, | 1952 |

OTHER REFERENCES

Proceedings of the National Electronics Conference, volume 5 (pp. 98–106).

Review of Scientific Instruments (vol. 19, No. 3) (pp. 181–187), March 1948.

Proceedings of the IRE, vol. 37, No. 9 (pp. 1000–1002), Sept. 1949.